(12) United States Patent
Hong et al.

(10) Patent No.: US 7,781,517 B2
(45) Date of Patent: *Aug. 24, 2010

(54) FLAME RETARDANT POLYMER COMPOSITION

(75) Inventors: Sang Hyun Hong, Gunpo-Si (KR); Sung Hee Ahn, Seoul (KR); Young Sik Ryu, Anyang-Si (KR); Tae Uk Kim, Suwon-Si (KR)

(73) Assignee: Cheil Industries Inc., Gyungsangbuk-do (KR)

( * ) Notice: Subject to any disclaimer, the term of this patent is extended or adjusted under 35 U.S.C. 154(b) by 1043 days.

This patent is subject to a terminal disclaimer.

(21) Appl. No.: 11/354,591

(22) Filed: Feb. 14, 2006

(65) Prior Publication Data

US 2006/0189730 A1 Aug. 24, 2006

Related U.S. Application Data

(63) Continuation-in-part of application No. PCT/KR2004/001236, filed on May 25, 2004.

(30) Foreign Application Priority Data

Aug. 14, 2003 (KR) ...................... 10-2003-0056532

(51) Int. Cl.
*C08K 5/49* (2006.01)
(52) U.S. Cl. .................. 524/710; 524/508; 524/583; 526/328; 526/329.3; 526/329.2; 526/335
(58) Field of Classification Search .................. 526/328, 526/329.3, 329.2, 335; 524/508, 583, 710
See application file for complete search history.

(56) References Cited

U.S. PATENT DOCUMENTS 3,849,368 A 11/1974 Anderson et al.
4,459,381 A 7/1984 Trivedi
4,618,633 A 10/1986 Taubitz
4,632,946 A 12/1986 Muench
5,030,674 A 7/1991 Notorgiacomo
6,054,515 A 4/2000 Blount
6,306,941 B1 10/2001 Klatt et al.
2006/0183825 A1 8/2006 Hong

FOREIGN PATENT DOCUMENTS

DE 42 09 029 A1 9/1993
DE 19 637 368 3/1998
EP 0 075 863 * 4/1983
EP 1 069 157 A1 7/2001
EP 1 262 519 12/2002
GB 2 003 888 3/1979
JP 61009450 1/1986
JP 10-195287 * 7/1998
WO WO 2004 029143 4/2004

OTHER PUBLICATIONS

Abstract of DE 4209029 published Sep. 23, 1993.
European Search Report completed Aug. 7, 2006 (for commonly owned EP application).
Abstract XP002393756 which relates to Abstract of JP 61009450 published Jan. 17, 1986.
Abstract of JP 61009450 published Jan. 17, 1986.
European Search Report for related application completed Mar. 12, 2007 with Annex.

* cited by examiner

*Primary Examiner*—Ling-Siu Choi
(74) *Attorney, Agent, or Firm*—Maria Parrish Tungol

(57) ABSTRACT

A polymer composition includes a substantially transparent, rubber modified aromatic vinyl resin and a cyclic alkyl phosphate compound. In some embodiments, the cyclic alkyl phosphate compound is able to impart good flame retardancy, while maintaining a good balance of the other physical and mechanical properties of the resin including the transparency and impact strength of the resin.

22 Claims, No Drawings

FLAME RETARDANT POLYMER COMPOSITION

CROSS-REFERENCE TO RELATED APPLICATIONS

This application is a continuation-in-part application under 35 U.S.C. §365(c) claiming the benefit of the filing date of PCT Application No. PCT/KR2004/001236 designating the United States, filed May 25, 2004. The PCT Application was published in English as WO 2005/017021 A1 on Feb. 24, 2005, and claims the benefit of the earlier filing date of Korean Patent Application No. 10-2003-0056532, filed Aug. 14, 2003. The contents of the PCT Application including its international publication and Korean Patent Application No. 10-2003-0056532 are incorporated herein by reference in their entirety.

BACKGROUND

1. Field

The invention relates to a polymer composition. More particularly, it relates to a flame retardant rubber modified aromatic vinyl composition.

2. Description of the Related Technology

Generally, acrylonitrile-butadiene-styrene copolymer (hereinafter, ABS resin) has a good balance of physical properties such as processability, mechanical strength, and chemical resistance. Thus, ABS resins are widely used in automobile, electrical appliances, office appliances, electronic goods, toys and so on. However, ABS resins are normally opaque, so, the application of such ABS resin has been restricted.

ABS resin is opaque because the refractive index between the matrix resin and dispersed rubber phase is different. This is usually because light is refracted between the interfaces. Additionally, light with visible wavelength may diffuse depending upon the size of the rubber particles. Therefore, in order to provide an ABS resin with good transparency, the refractive index of the rubber component should be substantially identical to that of the resin component as matrix. One method used is to control the size of the rubber particles to minimize the diffusion of light in the visible ray region.

Depending on the application in which the ABS resin is employed, it may be also advantageous for the resin to also be flame retardant. For example, heat-emitting products, such as computers and facsimiles, may cause a fire unless such resin is flame retardant. One method used to make an ABS transparent resin flame retardant is by the addition of halogenated compounds. However, the inclusion of a halogenated compound for flame retardancy may make the resin toxic. Therefore, non-halogenated compounds for use as flame retardants are desirable.

The use of non-halogenated compounds to impart sufficient flame retardancy to polymers resins is widely known. However, the addition of non-halogenated compounds typically results in the deterioration of heat resistance and transparency for the resin. Thus, there is a need to develop transparent ABS resins that have sufficient flame retardancy and heat resistance.

SUMMARY OF THE INVENTION

In some embodiments, a polymer composition comprises a transparent or translucent rubber modified aromatic vinyl resin; and a cyclic alkyl phosphate compound represented by Formula (I):

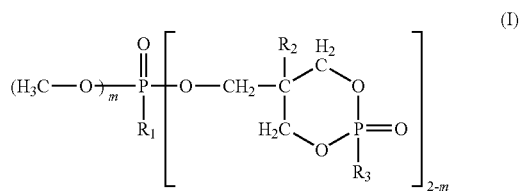

In embodiments, $R_1$, $R_2$, and $R_3$ are independently $C_{1-4}$ alkyl, and m is an integer of 0 or 1.

In some embodiments, the rubber modified aromatic vinyl resin is about 100 parts by weight and the cyclic alkyl phosphate compound is about 0.1 to about 15 parts by weight.

In some embodiments, the rubber modified aromatic vinyl resin comprises a rubber grafted copolymeric resin, wherein the resin comprises a rubber polymer and at least two or more repeating groups of monomers attached to the rubber polymer, the at least two or more repeating groups of monomers selected from the group consisting of an aromatic vinyl monomer, an unsaturated nitrile-containing monomer, and a (meth)acrylic alkyl ester monomer.

In some embodiments, the rubber modified aromatic vinyl resin additionally comprises an aromatic vinyl copolymer resin, wherein the aromatic vinyl copolymer resin is a copolymer comprising at least two or more repeating groups of monomers selected from the group consisting of an aromatic vinyl monomer, an unsaturated nitrile-containing monomer, and a (meth)acrylic alkyl ester monomer.

In embodiments, the rubber modified aromatic vinyl resin comprises about 20 to about 100% by weight of ($a_1$) a rubber grafted copolymeric resin made from about 5 to about 60 parts by weight of a rubber polymer, about 1 to about 30 parts by weight of aromatic vinyl monomer, about 10 to about 40 parts by weight of a unsaturated nitrile-containing monomer and about 10 to about 60 parts by weight of a (meth)acrylic acid alkyl ester monomer; and ($a_2$) about 0 to about 80% by weight of an aromatic vinyl copolymer resin made from about 40 to about 80 parts by weight of a (meth)acrylic acid alkyl ester monomer, about 10 to about 30 parts by weight of an aromatic vinyl monomer and about 0 to about 50 parts by weight of an unsaturated nitrile-containing monomer.

In some embodiments, the polymer composition further comprises an aromatic phosphate ester compound. In some of these embodiments, the aromatic phosphate ester compound is about 0.1 to about 20 parts by weight, based on 100 parts per weight of the substantially transparent, rubber modified aromatic vinyl resin. In some embodiments, the aromatic phosphate ester is represented by formula (II):

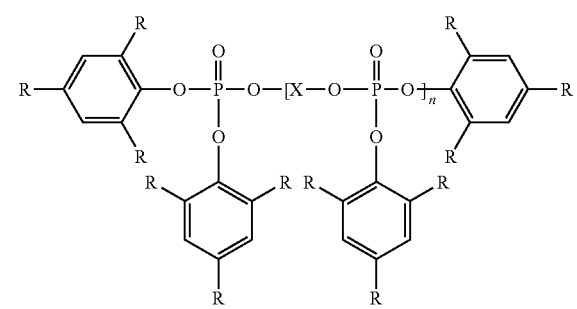

In the formula (II), R is independently hydrogen or $C_{1-4}$ alkyl X is derived from a compound comprising two hydroxyaryl groups; and n is an integer of 0, 1, 2, 3, or 4. In some embodiments, the aryl compound comprising two hydroxy groups is selected from the group consisting of resorcinol, hydroquinone, bisphenol-A. In other embodiments, X is selected from arylene or a compound comprising more than one aryl group.

In some embodiments, the composition is formed in a shaped article. In some embodiments, the article has a flame retardancy of V-2, V-1, or V-0 when a specimen of the article is tested under the standard UL-94VB (1/10"). In some of these embodiments, the flame retardancy is V-2.

In other embodiments, the article has transmission coefficient of light of at least about 88% when a 10×10×3 mm specimen is tested. In some embodiments, the article has transmission coefficient of light of at least about 88.5% when a 10×10×3 mm specimen is tested. In a few embodiments, the article has transmission coefficient of light of at least about 89% when a 10×10×3 mm specimen is tested.

In some embodiments, the article has impact strength greater than or equal to about 10 kgf·cm/cm when a specimen of the article is tested under the standard ASTM D-256 A (1/8" notched) at 23° C. In other embodiments, the article has impact strength greater than or equal to about 11 kgf·cm/cm when a specimen of the article is tested under the standard ASTM D-256 A (1/8" notched) at 23° C.

Embodiments may also include an electronic device, comprising an electrical circuit; and a housing enclosing at least part of the electrical circuit, the housing comprising a portion, which comprises the polymer compositions of certain embodiments. In some embodiments, the portion has flame retardancy of V-2, V-1, or V-0 when tested under the standard UL-94VB (1/10"). Additionally, the portion may have transmission coefficient of light of at least about 88% when a 10×10×3 mm specimen is tested.

One further embodiment includes a method of making an electronic device, comprising providing an electrical circuit, providing a housing comprising a portion, and enclosing at least part of the electrical circuit with the housing, wherein the portion comprises the polymer compositions as described herein.

DETAILED DESCRIPTION OF EMBODIMENTS

As noted above, one aspect of this invention relates to a polymer composition. According to various embodiments, the polymer composition comprises a transparent or translucent (non-opaque) rubber-modified aromatic vinyl resin and a cyclic alkyl phosphate compound. Molded articles comprising the polymer composition of the embodiments show enhanced physical or mechanical properties as compared to other compositions less one or more components. The molded articles of the embodiments also demonstrate improved flame retardancy over compositions less one or more components. As will be discussed, the molded articles according to embodiments of the invention have good flame retardancy and transparency, while maintaining excellent impact strength.

In one embodiment, the flame retardant polymer composition can comprise a transparent or translucent, rubber modified aromatic vinyl resin and a cyclic alkyl phosphate compound. One embodiment includes a cyclic alkyl phosphate compound having the following formula (I):

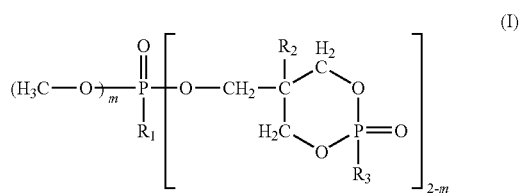

In the formula, $R_1$, $R_2$, and $R_3$ are independently selected from $C_{1-4}$ alkyl, and m is 0 or 1.

Other embodiments can include an aromatic phosphate ester compound. This compound can be represented by formula (II):

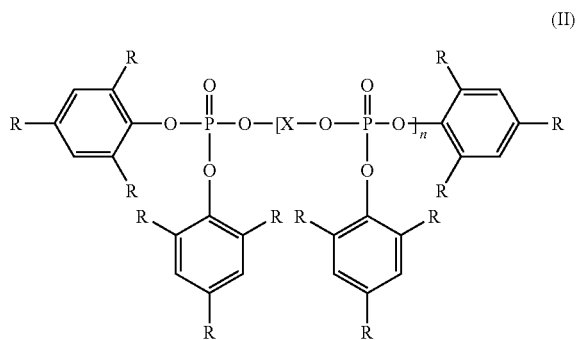

In some embodiments, each R is independently hydrogen or $C_{1-4}$ alkyl.

According to some embodiments, the polymer composition comprises (A) 100 parts by weight of a transparent or translucent rubber-modified aromatic vinyl resin; (B) 0.1 to 15 parts by weight of a cyclic alkyl phosphate compound; and optionally (C) 0 to 20 parts by weight of an aromatic phosphate ester compound. These components are further described herein.

Rubber Modified Aromatic Vinyl Resin

According to some embodiments, the polymer composition comprises a transparent or translucent, rubber modified aromatic vinyl resin. In some embodiments, the rubber modified aromatic vinyl resin is non-opaque. In some embodiments, the rubber modified aromatic vinyl comprises a rubber phase polymer to which monomers are polymerized. The rubber phase polymer may be graft copolymerized with monomers or copolymers. In some embodiments, these monomers and or copolymers may be aromatic vinyl monomers. Additionally, the aromatic vinyl monomers can be copolymerized with unsaturated nitrile-containing monomers or (meth)acrylic alkyl ester monomers. In these embodiments, the transparent, rubber modified aromatic vinyl resin comprises the rubber grafted copolymeric resin ($a_1$). In some embodiments, the rubber modified aromatic vinyl resin may comprise both a rubber grafted copolymer resin ($a_1$) and an additional aromatic vinyl copolymer resin ($a_2$). The additional aromatic vinyl copolymer resin may serve as an additional matrix to which the rubber grafted copolymer resin can be dispersed in the rubber modified aromatic vinyl resin.

In some embodiments, the rubber modified aromatic vinyl resin comprises ($a_1$) about 20 to about 100% by weight of the rubber grafted copolymeric resin and ($a_2$) about 0 to about 80% by weight of the aromatic vinyl copolymer resin. Preferably, the rubber modified aromatic vinyl resin may comprise ($a_1$) about 20 to about 70% by weight of the rubber graft copolymeric resin and ($a_2$) about 30 to about 80% the aromatic vinyl copolymer resin. However, some embodiments of the rubber aromatic vinyl resin comprise about 10, 15, 20, 25, 30, 35, 40, 45, 50, 55, 60, 65, 70, 75, 80, 85, 90, 95, and about 100% by weight of a rubber grafter copolymer resin. Some of these embodiments additionally comprises about 0, 5, 10, 15, 20, 25, 30, 35, 40, 45, 50, 55, 60, 65, 70, 75, 80, 85, and about 90% by weight of the aromatic vinyl copolymer resin.

($a_1$) Rubber Grafted Copolymeric Resin

In some embodiments, the rubber used for the rubber grafted copolymeric resin include, but are not limited to, a diene-containing rubber such as polybutadiene, poly(styrene-butadiene) and poly(acrylonitrile-butadiene); a saturated form of a diene rubber; an isoprene rubber; an acrylic rubber such as poly(butyl acrylic acid); and a terpolymer of ethylene-propylene-diene(EPDM), etc. In some embodiments, a diene-containing rubber, such as a butadiene-containing rubber is used. In embodiments, rubber particles may have an average particle size of from about 0.1 to about 4 μm.

In some embodiments, at least one aromatic vinyl monomer can be used as a monomer that attaches to the rubber polymer. Examples of aromatic vinyl monomer are styrene, α-methyl styrene, p-methyl styrene, 1-methyl-4-(prop-1-en-2-yl) benzene, 1,3-dimethyl-5-(prop-1-en-2-yl)benzene, 1-vinyl naphthalene, 1-(prop-1-en-2-yl)naphthalene, and so forth. The content of aromatic vinyl monomer repeating unit in the graft copolymer resin is preferably in the range of about 0.1 to about 30 parts by weight, and more prefereably about 1 to about 30 parts by weight based on the total weight of the the rubber grafted copolymeric resin. In other embodiments, the content of aromatic vinyl monomer is preferably in the range of about 30 to about 45 parts by weight based on the total weight of the rubber grafted copolymeric resin.

At least two copolymerizable monomers may be introduced and applied to said aromatic vinyl monomers (or directly to the rubber or a rubber grafted with the aromatic vinyl monomers). In some embodiments, an unsaturated nitrile-containing monomer such as acrylonitrile or methacrylonitrile are copolymerized with the aromatic vinyl monomer. In other embodiments, (meth)acrylic alkyl ester monomers containing 1 to 10 carbon atoms may be copolymerized with the aromatic vinyl monomer. Such (meth) acrylic alkyl ester monomers include methylmethacrylate, ethylmethacrylate, butylmethacrylate, ethyl acrylate, methyl acrylate, butyl acrylate, and so forth.

The rubber grafted copolymeric resin according to some embodiments is prepared by graft polymerizing about 5 to about 60 parts by weight of a rubber polymer, about 1 to about 30 parts by weight of an aromatic vinyl monomer, about 10 to about 40 parts by weight of an unsaturated nitrile-containing monomer, and about 10 to about 60 parts by weight of a (meth)acrylic alkyl ester monomer. In the practice of the graft polymerization, the grafting monomers can be added to the base rubber latex all at once, or it may also be added in portions or continuously. However, in some embodiments, the graft-polymerization can take place in multiple steps.

For example, a multi-step reaction may comprise a first step of graft-polymerizing monomers into a rubber polymer by using oil-soluble peroxide initiator and a second step of preparing a graft copolymer having a core-shell structure by using a water-soluble initiator, such as potassium peroxidisulfate, and grafting the surface of the rubber particles with additional monomers when the conversion rate reaches higher than 90%.

($a_2$) Aromatic Vinyl Copolymer Resin

In some embodiments, the aromatic vinyl copolymer resin can be prepared by adding a (meth)acrylic alkyl ester monomer, an aromatic vinyl monomer and an unsaturated nitrile-containing monomer to a reactor simultaneously to copolymerize the monomers in one-step. In other embodiments, the aromatic vinyl copolymer resin can be prepared in multiple steps. For example, the aromatic vinyl copolymer resin can by synthesized by adding a (meth)acrylic alkyl ester monomer and an aromatic vinyl monomer to a reactor at one time to initiate the copolymerzation and subsequently adding an unsaturated nitrile-containing monomer continuously or in portion several times to complete the polymerization.

In one embodiment, a two-step polymerization may be carried out by adding a monomer mixture containing about 40 to about 80 parts by weight of a (meth)acrylic alkyl ester monomer and about 10 to about 30 parts by weight of an aromatic vinyl monomer, initiator, dispersant, dispersion aid, molecular weight controlling agent and deionized water to a reactor followed by agitating and increasing the reaction temperature to initiate the copolymerzation. This may then by followed by the addition of about 0 to about 50 parts by weight of an unsaturated nitrile-containing monomer continuously or in portion several times to complete the polymerization.

In another embodiment, a one-step polymerization is carried out in the same manner as the two-step polymerization except that the unsaturated nitrile monomer is added together with other monomers in the first step.

In some embodiments, the reaction temperature varies depending upon the kind of initiator used. For example, when an azo-type initiator such as azobisisobutyronitrile is used, the polymerization reaction proceeded at about 70 to about 85° C. for about 1 to about 5 hours and the temperature was increased to about 100° C. to polymerize for about 20 to about 90 minutes after which the reaction is terminated. When a hydroperoxide type initiator such as benzoylperoxide is used, the polymerization reaction proceeds at about 85 to about 100° C. for about 1 to 5 hours and heated again to about 100° C. and allowed to stand for about 20 to about 90 minutes until the completion of the polymerization. It is preferable that the polymerization temperature profile has an increasing slope, in which the polymerization reaction starts at low temperature but completes at a higher temperature. However, in another embodiments, the polymerization may proceed at a substantially constant temperature throughout the reaction. In some embodiments, the amount of the initiator is about 0.01 to about 1 part by weight based on total weight of the aromatic vinyl copolymer resin, and more preferably about 0.1 to about 0.3 parts by weight.

In embodiments, examples of the monomers for the aromatic vinyl copolymer resin, examples of the aromatic vinyl monomer include styrene, o-, m-, p-ethylstyrene, α-methylstyrene, 1-methyl-4-(prop-1-en-2-yl) benzene, 1,3-dimethyl-5-(prop-1-en-2-yl)benzene, 1-vinyl naphthalene, 1-(prop-1-en-2-yl)naphthalene, and so forth. Examples of an unsaturated nitrile-containing monomer include acrylonitrile, methacrylonitrile, ethacrylonitrile, etc. Examples of (meth)acrylic alkyl ester monomers are include methylmethacrylate, ethylmethacrylate, butylmethacrylate, methyl acrylate, ethyl acrylate, propyl acrylate. The monomer examples that can be used in the rubber grafted copolymeric resin can also be used in the aromatic vinyl copolymer resin.

In embodiments related to the synthesis of an aromatic vinyl copolymer resin, examples of a dispersant include metal phosphates such as tricalcium phosphate, trisodiumphosphate, polyvinylalcohol, polyvinylpyrrolidone and so on. In some embodiments, the dispersant is about 0.05 to about 1 part by weight, and more preferably about 0.1 to about 0.5 parts by weight, based on the total weight of the aromatic vinyl copolymer resin. For the dispersion aid, either a water soluble or oil soluble one can be used.

In embodiments related to the synthesis of an aromatic vinyl copolymer resin, a molecular weight controlling agent may be used. Examples include, but are not limited to, mercaptans, terpinolenes, α-methylstyrene oligomers, and mixtures thereof. In some embodiments, the amount of the molecular weight controlling agent is 0 to 1 parts by weight, and more preferably about 0.4 to about 0.7 parts by weight, based on total weight of the aromatic vinyl copolymer resin. A resulting solid may be dehydrated and dried to obtain a aromatic vinyl copolymer resin in a powdery state.

Cyclic Alkyl Phosphate Compound

In certain embodiments, the rubber modified aromatic vinyl resin is used together with a cyclic alkyl phosphate compound. As noted above, the cyclic alkyl phosphate compound is represented by the following chemical formula (I):

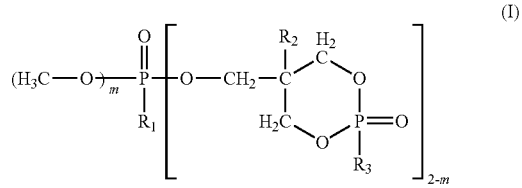

(I)

In the formula, $R_1$, $R_2$, and $R_3$ are independently selected from $C_{1-4}$ alkyl. $R_1$ can be any number of given variations of $C_{1-4}$ alkyl. For example, $R_1$, $R_2$, or $R_3$ can be selected from methyl, ethyl, propyl, isopropyl, butyl, sec-butyl, and tert butyl. $R_1$, $R_2$, and $R_3$ may also be substituted or unsubstituted, which may result in some branching of the alkyl group. "Substituted" means that the base organic radical has one or more substituents. For example, substituted cyclohexyl means a cyclohexyl radical that has one or more substituents. Substituents include, but are not limited to, halogen, —CN, $CF_3$, —$NO_2$, —$NH_2$ and —OH.

In the formula, m is either 0 or 1.

Examples of the cyclic alkyl phosphate compound having the above formula include methyl-bis(5-ethyl-2-methyl-1,3,2-dioxaphorinan-5-yl) methyl methyl phosphonic acid ester P-oxide, methyl-bis(5-ethyl-2-methyl-1,3,2-dioxaphorinan-5-yl) phosphonic acid ester P, P'-dioxide.

The cyclic alkyl phosphate compound (B) of certain embodiments can be used alone or in combination with other cyclic alkyl phosphate ester compounds, with the total amount of about 0.5 to about 15 parts by weight, preferably 0.5 to 10 parts by weight, more preferably 1 to 10 parts by weight, based on the rubber modified aromatic vinyl resin totaling 100 parts by weight. Other embodiments of the polymer composition are described above. Without wishing to be bound to any particular theory, we believe that the amount of the cyclic alkyl phosphate compound may control the balance of flame retardancy and the polymer compositions other physical and mechanical properties. For example, if amount of the cyclic alkyl phosphate compound used is too small, the resin composition has worse flame retardancy. Another example would be if the amount of the cyclic alkyl phosphate compound is too great, it may result in a lower heat resistance and/or transparency of the resin composition.

In other embodiments, the polymer composition comprises (A) about 100 parts by weight of a rubber modified aromatic vinyl resin and about 0.1, 0.3, 0.5, 0.7, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 parts by weight of a cyclic alkyl phosphate. However, some embodiments comprise about 15, 16, 17, 18, 19, 20, 21, 22, 23, 24, 25, 26, 27, 28, 29 30, 31, 32, 33, 34, or 35 parts by weight of the cyclic alkyl phosphate compound. In some of these embodiments, the cyclic alkyl phosphate compound is represented by formula (I). Other embodiments comprise less than 0.1 parts by weight, including 0.02, 0.04, 0.06, and 0.08 parts by weight.

Aromatic Phosphate Ester Compound

Some embodiments of the composition additionally comprise an aromatic phosphate ester compound. As noted above, this compound has the following structural formula (II):

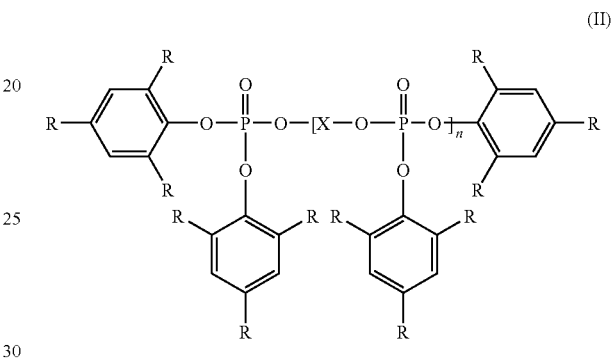

(II)

In some embodiments, each R is independently hydrogen or $C_{1-4}$ alkyl. For example, R can be selected from methyl, ethyl, propyl, isopropyl, butyl, sec-butyl, and tert-butyl. In other embodiments, the alkyl group may be substituted with a halogen, an alkene group, or an alkyne group. Each R may be selected independently from another R on the same or a different phenyl ring.

In certain embodiments, X is derived from a compound comprising two hydroxyaryl groups, and n is an integer 0, 1, 2, 3 or 4. For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth. In some embodiments, X is a $C_6$-$C_{20}$ arylene group or alkyl-substituted $C_6$-$C_{20}$ arylene group.

Where n is 0, the aromatic phosphate ester compound can be triphenyl phosphate, tri(2,6-dimethyl) phosphate, and the like. Where n is 1, the aromatic phosphate ester compounds include resorcinol bis(diphenyl) phosphate, resorcinol bis(2,6-dimethyl phenyl) phosphate, resorcinol bis(2,4-ditertiary butyl phenyl) phosphate, hydroquinone bis (2,6-dimethyl phenyl) phosphate, hydroquinone bis(2,4-ditertiary butyl phenyl) phosphate, and the like. The compounds can be used alone or in combination with one or more other aromatic phosphate ester compounds.

In certain embodiments, the aromatic phosphate ester can be used in the amount of about 0 to about 20 parts by weight, and more preferably from about 0 to about 10 parts by weight based on 100 parts by weight of the rubber modified aromatic vinyl resin. In some embodiments, the polymer composition comprises about 0.03, 0.05, 0.08, 0.1, 0.5, 1, 1.5, 2, 2.5, 3, 3.5, 4, 4.5, 5, 5.5, 6, 6.5, 7, 7.5, 8, 8.5, 9, 9.5, and 10 parts by weight of an aromatic phosphate ester. In other embodiments, the polymer composition comprises about 11, 12, 13, 14, 15, 16, 17, 18, 19, 20, 21, 22, 23, 24, 25, 26, 27, 28, 29, 30, 31, 32, 33, 34, 35, 36, 37, 38, 39, and about 40 parts by weight of the aromatic phosphate ester.

However, some embodiments may use other phosphate esters and aromatic phosphate esters. The phosphate esters include trialkyl derivatives such as triethyl or trioctyl phosphate, and triaryl derivatives such as triphenyl phosphate and aryl-alkyl derivatives such as 2-ethylhexyl-diphenyl phosphate. A person having ordinary skill in the art will understand other suitable phosphate esters for this application.

Other Components

The polymer compositions can contain one or more compounds or polymers in addition to the foregoing components. Additional components or additives may be added to provide additional properties or characteristics to the molding composition or to modify existing properties of the composition. For example, an inorganic filler such as glass fiber, carbon fiber, talc, silica, mica, and alumina may be added to improve mechanical strength and heat distortion temperature of the resin composition. In addition, the polymer composition may further include a heat stabilizer, an anti-oxidant, an ultraviolet absorbing agent, a light stabilizer, a flame retardant, a lubricant, a pigment and/or dye. In these embodiments, additives are employed in an amount of 0 to 30 parts by weight as per 100 parts by weight of the transparent rubber modified aromatic vinyl resin. One of ordinary skill in the art will appreciate that various additives may be added to the polymer compositions according to embodiments of the invention.

Preparation of Compositions

The polymer compositions can be prepared by mixing components including a rubber-modified aromatic vinyl resin and a cyclic alkyl phosphate compound. In some embodiments, one or more other additives may be mixed together with the components of the polymer composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. For example, the rubber modified aromatic vinyl resin may first be mixed with the cyclic alkyl phosphate compound, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a predetermined shape and cured to form a molded article.

Properties of Compositions

An advantage of certain embodiments is to provide a flame retardant thermoplastic resin composition with good flame retardancy and transparency or translucency. Another advantage of some embodiments is to provide a flame retardant thermoplastic resin composition with good properties, such as impact strength. In some embodiments, one advantage is to provide an environmentally friendly and non-toxic flame retardant thermoplastic resin composition which does not contain a halogen-containing compound.

Certain embodiments have an enhanced flame retardancy of V-2, V-1, or V-0 when a specimen of the composition is tested under the standard UL-94VB with 1/10". These samples may be of the composition or of shaped articles comprising the compositions.

Some embodiments also have an enhanced impact strength of at least about 10 kg·cm/cm, more preferably at least about 11 kg·cm/cm, and even more preferably at least about 12 kg·cm/cm, when a specimen of the composition is tested according to the standard ASTM D256 A (1/8" notched) at 23° C.

Certain embodiments also have a transmission coefficient of light including at least about 88%, more preferably at least about 88.5%, and even more preferably at least about 89%, when the light transmission is measured in a 10×10×3 mm specimen. Some other embodiments have enhanced transmission of light including at least about 89.2%. Some of the embodiments with enhanced transmission capability also additionally retain their flame retardancy as described herein. For example, some embodiments have light transmission of about 89% when light transmission is measured in a 10×10×3 mm specimen, and additionally have a flame retardancy of V-2, V-1, and V-0 when tested under the standard UL-94VB (1/10").

Shaped Articles

A shaped article can be made using the polymer composition according to the foregoing embodiments. In some embodiments, this article is molded into various shapes. An extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical and non-electrical, in which a molded article made of the blend of the composition according to embodiments of the invention are used, include printers, computers, word processors, keyboards, personal digital assistants (PDA), telephones, mobile phones, cameras, camera carrying devices, bags, table surfaces, laminates, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composition comprising a transparent rubber-modified aromatic vinyl resin and a cyclic alkyl phosphate compound as described below. Some embodiments provide a method of making an electronic device, comprising providing an electrical circuit; providing a housing comprising a portion; and enclosing at least part of the electrical circuit with the housing, wherein the portion comprises the composition which comprises a transparent, rubber modified aromatic vinyl resin and a cyclic alkyl phosphate compound as described below.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the components of the polymer compositions of Examples 1-4 and Comparative Examples 1-2 are as follows Rubber Modified Aromatic Vinyl Resin ($a_1$) Rubber Grafted Copolymeric Resin To a 10 L glass reactor provided with a agitation impeller, thermometer, mantle, reflux condenser, 50 parts by weight of polybutadiene latex (solid content), 10 parts by weight of methylmethacrylate, 3 parts by weight of styrene, 1 parts by weight of acrylonitrile, 120 parts of deionized water, 0.5 parts of potassium stearate, 0.3 parts by weight of t-dodecyl mercaptan, and 0.2 parts by weight of cumene hydroperoxide were added and mixed. The mixture was heated to the temperature of about 60° C. To the reactant, 0.003 parts by weight of ferrous sulfate, 0.2 parts by weight of sodium sulfoxylate formadehyde, and 0.1 parts by weight of ethylenediamine tetraacetate were added to the reactor and polymerized for 1 hour to reach to the conversion rate of 90%.

Then, 0.4 parts by weight of potassium peroxidisulfate (KPS) was added to the reactor followed by feeding a compound mixture to the reactor continuously for about 3 hours to proceed the graft polymerization. The compound mixture was prepared by mixing 25.5 parts by weight of methylmethacrylate, 8 parts by weight of styrene and 2.5 parts by weight of acrylonitrile. After completion of feeding the compound mixture, the reaction was continued for 1 hour and then terminated. The resulting graft latex was cooled to the room temperature, and then coagulated, dehydrated and dried to obtain graft ABS resin (g-ABS) in powder form.

($a_2$) Aromatic Vinyl Copolymer Resin 50 parts by weight of methylmethacrylate (MMA), 20 parts by weight of styrene, 0.2 parts by weight of azobisisobutyronitrile (AIBN), 0.5 parts by weight of tricalcium phosphate, 0.01 parts by weight of carboxylic acid polymers, 0.2 parts by weight of t-mercaptane and 200 parts of deionized water were charged into a reactor and heated to the temperature of about 70° C. while being agitated sufficiently to proceed the polymerization. Next, about 30 parts by weight of acrylonitrile, was added to the reactor continuously for about 3 hours. The polymerization temperature was gradually elevated to 90° C. for 3 hours, and further elevated to 100° C. The reaction was continued at 100° C. for 60 minutes, and the temperature was cooled to terminate the reaction. The resulting copolymer was washed and dried to obtain white bead.

Cyclic Alkyl Phosphate Compound

Antiblaze 1045 available from Rhodia Co. was used. Antiblaze 1045 contains 8% by weight of methyl-bis(5-ethyl-2-methyl-1,3,2-dioxaphorinan-5yl) methyl methyl phosphonic acid ester P-oxide and 85% by weight of methyl-bis (5-ethyl-2-methyl-1,3,2-dioxaphorinan-5yl) phosphonic acid ester P, P'-dioxide.

Aromatic Phosphate Ester Compound

Resorcinol bis (2,6-dimethylphenyl)phosphate available from Daihachi Chemical of Japan (product name: PX200) was used.

Examples 1-4

The components as shown in Table 1 were mixed and the mixture was extruded at 180-250° C. with a conventional twin screw extruder in pellets. The resin pellets were dried at 80° C. for 3 hours, and molded into test specimens using a 6 oz injection molding machine at 180-280° C. and mold temperature of 40-80° C.

The flame retardancy of the test specimens was measured in accordance with UL94VB with a thickness of 1/10". The impact strength was measured according to Izod impact strength ASTM D-256 A (1/8" notch) at 23° C. The transmission coefficient of light was measured by use of color computer of Suga Instrument of Japan with a 10×10×3 mm specimen.

Comparative Examples 1-2

Comparative Examples 1-2 were conducted in the same manner as in Example 1 except that resorcinol bis (2,6-dimethylphenyl)phosphate was used as a flame retardant instead of a cyclic alkyl phosphate compound.

TABLE 1

| | | Examples | | | | Comparative Examples | |
|---|---|---|---|---|---|---|---|
| | | 1 | 2 | 3 | 4 | 1 | 2 |
| Transparent Rubber Modified | ($a_1$) | 27 | 27 | 30 | 35 | 27 | 32 |
| Aromatic Vinyl Resin | ($a_2$) | 73 | 73 | 70 | 65 | 68 | 68 |
| Cyclic Alkyl Phosphate Compound | | 4 | 3 | 5 | 3 | — | — |
| Aromatic Phosphate Ester Compound | | — | 2 | — | 3 | 6 | 15 |
| UL 94 flame retardancy (1/10") | | V2 | V2 | V2 | V2 | Fail | V2 |
| Izod impact strength 1/8"(kgf · cm/cm) | | 11 | 10 | 11 | 12 | 9 | 4 |
| Transmission coefficient of the entire light (%) | | 89.2 | 88.0 | 89.0 | 88.7 | 85.5 | 82.3 |

As shown above, the resin compositions employing a cyclic alkyl phosphate compound as a flame retardant show good dripping flame retardancy and transparency or translucency without no deterioration of impact strength compared to those employing the aromatic phosphate ester compound alone. Thus, in some embodiments, a molded article comprising the composition can provide good physical properties when used in the production of electronic products. Some embodiments have advantages in that they show excellent flame retardancy and transparency or translucency while maintaining impact resistance.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that follow.

What is claimed is:

1. A composition comprising: a resin component comprising a transparent or translucent rubber modified aromatic vinyl resin having at least two or more repeating groups of monomers attached to the rubber polymer wherein at least one of the monomers is (meth)acrylic acid alkyl ester monomer; and a phosphate ester flame retardant wherein the flame retardant is a cyclic alkyl phosphate ester compound represented by Formula (I):

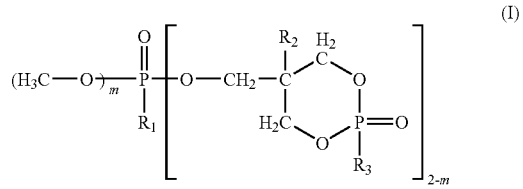

wherein $R_1$, $R_2$, and $R_3$ are independently $C_{1-4}$ alkyl, and wherein m is an integer of 0 or 1.

2. The composition of claim 1, wherein the rubber modified aromatic vinyl resin component is about 100 parts by weight and the cyclic alkyl phosphate compound is about 0.1 to about 15 parts by weight.

3. The composition of claim 1, wherein the transparent or translucent rubber modified aromatic vinyl resin is a rubber polymer and at least two or more repeating groups of monomers attached to the rubber polymer, the at least two or more repeating groups of monomers selected from the group consisting of an aromatic vinyl monomer, an unsaturated nitrile-containing monomer, and a (meth)acrylic alkyl ester monomer, wherein at least one monomer is a (meth)acrylic alkyl ester monomer.

4. The composition of claim 3, wherein the resin component additionally comprises an aromatic vinyl copolymer resin, wherein the aromatic vinyl copolymer resin is a copolymer comprising at least two or more repeating groups of monomers selected from the group consisting of an aromatic vinyl monomer, an unsaturated nitrile-containing monomer, and a (meth)acrylic alkyl ester monomer.

5. The composition of claim 1, wherein the resin component comprises about 20 to about 100% by weight of (a1) a rubber grafted copolymeric resin made from about 5 to about 60 parts by weight of a rubber polymer, about 1 to about 30 parts by weight of aromatic vinyl monomer, about 10 to about 40 parts by weight of a unsaturated nitrile-containing monomer and about 10 to about 60 parts by weight of a (meth) acrylic acid alkyl ester monomer; and (a2) about 0 to about 80% by weight of an aromatic vinyl copolymer resin made from about 40 to about 80 parts by weight of a (meth)acrylic acid alkyl ester monomer, about 10 to about 30 parts by weight of an aromatic vinyl monomer and about 0 to about 50 parts by weight of an unsaturated nitrile-containing monomer.

6. The composition of claim 1, further comprising an aromatic phosphate ester compound.

7. The composition of claim 6, wherein the aromatic phosphate ester compound is about 0.1 to about 20 parts by weight, based on 100 parts per weight of the rubber modified aromatic vinyl resin.

8. The composition of claim 6, wherein the aromatic phosphate ester compound is represented by formula (II):

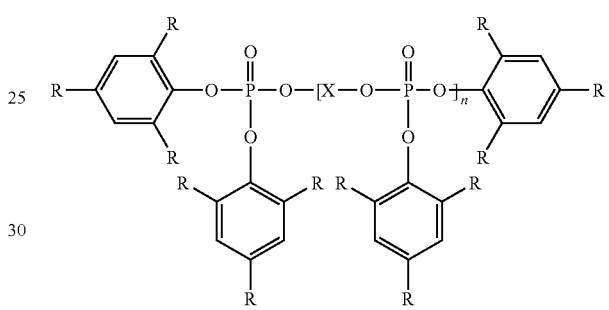

wherein R is independently hydrogen or $C_{1-4}$ alkyl;
wherein X is derived from an aryl compound comprising two hydroxy groups; and
wherein n is an integer of 0, 1, 2, 3, or 4.

9. The composition of claim 8, wherein the aryl compound comprising two hydroxy groups is selected from the group consisting of resorcinol, hydroquinone, bisphenol-A.

10. The composition of claim 8, wherein X is arylene or a compound comprising more than one aryl group.

11. The composition of claim 1, wherein the composition is formed in a shaped article.

12. The composition of claim 11, wherein the article has a flame retardancy of V-2, V-1, or V-0 when a specimen of the article is tested under the standard UL-94VB (1/10").

13. The composition of claim 12, wherein the flame retardancy is V-2.

14. The composition of claim 11, wherein the article has transmission coefficient of light of at least about 88% when a 10×10×3 mm specimen is tested.

15. The composition of claim 11, wherein the article has transmission coefficient of light of at least about 88.5% when a 10×10×3 mm specimen is tested.

16. The composition of claim 11, wherein the article has transmission coefficient of light of at least about 89% when a 10×10×3 mm specimen is tested.

17. The composition of claim 11, wherein the article has impact strength greater than or equal to about 10 kgf-cm/cm when a specimen of the article is tested under the standard ASTM D-256 A (1/8" notched) at 23° C.

18. The composition of claim 11, wherein the article has impact strength greater than or equal to about 11 kgf-cm/cm when a specimen of the article is tested under the standard ASTM D-256 A (1/8" notched) at 23° C.

19. A composition of claim 1 wherein the resin component consists essentially of a transparent or translucent rubber modified aromatic vinyl resin having at least two or more repeating groups of monomers attached to the rubber polymer wherein at least one of the monomers is (meth)acrylic acid alkyl ester monomer.

20. A composition of claim 1 wherein the resin component consists essentially of:
   (a1) a transparent or translucent rubber modified aromatic vinyl resin having at least two or more repeating groups of monomers attached to the rubber polymer wherein at least one of the monomers is (meth)acrylic acid alkyl ester monomer and
   (a2) an aromatic vinyl copolymer resin, wherein the aromatic vinyl copolymer resin is a copolymer comprising at least two or more repeating groups of monomers selected from the group consisting of an aromatic vinyl monomer, an unsaturated nitrile-containing monomer, and a (meth)acrylic alkyl ester monomer.

21. A composition of claim 1 wherein the resin component consists of a transparent or translucent rubber modified aromatic vinyl resin having at least two or more repeating groups of monomers attached to the rubber polymer wherein at least one of the monomers is (meth)acrylic acid alkyl ester monomer.

22. A composition consisting essentially of a transparent or translucent rubber modified aromatic vinyl resin having at least two or more repeating groups of monomers attached to the rubber polymer wherein at least one of the monomers is (meth)acrylic acid alkyl ester monomer; and a phosphate ester flame retardant wherein the flame retardant consists of a cyclic alkyl phosphate compound represented by Formula (I):

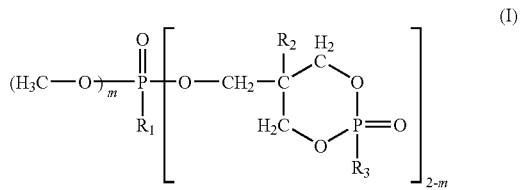

wherein $R_1$, $R_2$, and $R_3$ are independently $C_{1-4}$ alkyl, and m is an integer of 0 or 1.

* * * * *